Aug. 13, 1957  J. A. HATCH  2,802,372
CAST WORM WHEEL AND METHOD AND APPARATUS FOR
MANUFACTURING THE SAME
Filed Aug. 19, 1955  9 Sheets-Sheet 3

INVENTOR
JAMES A. HATCH
BY
ATTORNEYS

Fig. 10.

Aug. 13, 1957  J. A. HATCH  2,802,372
CAST WORM WHEEL AND METHOD AND APPARATUS FOR
MANUFACTURING THE SAME
Filed Aug. 19, 1955   9 Sheets-Sheet 7

INVENTOR
JAMES A. HATCH
BY
ATTORNEYS

FIG.15.

United States Patent Office 2,802,372
Patented Aug. 13, 1957

2,802,372

CAST WORM WHEEL AND METHOD AND APPARATUS FOR MANUFACTURING THE SAME

James A. Hatch, Detroit, Mich.

Application August 19, 1955, Serial No. 529,476

6 Claims. (Cl. 74—458)

The present invention relates to the manufacture of worm wheels and related gear members, being particularly concerned with the production of a commercially acceptable cast worm wheel in which the tooth contour is formed by a casting operation alone with such precision that no subsequent machining of their cast surfaces is required. The invention enables a worm wheel of this character to be produced with a saving of up to 25%–30% of the metal required for the production of a gear of this size by conventional procedures involving machining operations on a gear blank.

In other aspects, the invention contemplates a method and apparatus particularly suitable for the construction of foundry molds for the highly accurate casting of the teeth of worm wheels of the type for use with a cylindrical worm or of the type for use with a double enveloping worm.

In another aspect, it is an object of the invention to provide alternative methods for the forming, cutting or generating of mold cavities corresponding to the teeth of a worm wheel, these cavities preferably being formed on a plurality of arcuately-shaped blanks or segments which, when fitted together, make up a composite ring-like mold by means of which the teeth are precision cast.

More specifically, the invention contemplates methods for machining contours constituting mold cavities on a blank by causing relative motion between a blank and a rotary cutter, the path of motion being defined as the resultant of two simultaneous arcuate movements, one described by an arc having its center lying in an axis corresponding to the rotational axis of the worm with which the cast wheel will be used, and the other described by an arc having its center corresponding to the rotational axis of the wheel to be cast. In the preferred embodiment of the machine for carrying out such methods, the cutter is held fixed with respect to said axes and the simultaneous motion is imparted to the blank.

One of the many advantages stemming from the present invention is that the over-all number of special machines or tools usually necessitated in the manufacture of wheels is considerably reduced and this effects a large saving in tool equipment.

Another advantage resides in the substantial reduction in total metal cost for a wheel which is made possible because most of the metal which is necessary in the teeth area where teeth are formed by machining operations is not required for the casting operation.

A further object of the invention is to produce an improved chill cast bronze worm wheel in which the whole mass of each tooth and the areas adjacent the tooth root have the desired metallurgical properties for optimum operating characteristics.

A uniformly fine grain structure exists from the engaging surfaces of the teeth of the worm wheel inwardly, resulting in improved wearing qualities and greater tensile strength as compared with a conventionally machined gear. This uniformity results from the chill casting of the material of the worm wheel, such as bronze, against a multiple segment mold of the character referred to above. By contrast, the production of a machine-developed gear necessitates the removal of a substantial layer of the material, exposing at the ultimate gear tooth surface a grain structure which may vary in uniformity across the length and depth of the tooth and include relatively coarse and fine grain characteristics.

Generally considered, it is an object of the invention to provide an improved method of producing chill cast gears of such precision as to their tooth formation as to require no subsequent machining of the cast surfaces, which method, from beginning to end, involves the casting of an appropriate circular blank from which a mold is ultimately formed; the subdivision of this mold into arcuate segments of suitable size, as by sawing; the machining of these individual segments to provide on the arcuate, smaller diameter surfaces of each thereof a mold tooth contour of convex curvature, from side to side of the segment; the reassembly of the machined mold sections in the form of a continuous annular mold; the casting of the desired metal against the machined inner annular surface of the assembled segments, and the removal of the segments from the cast metal. The machining operation is performed by cuts involving a composite relative motion of a cutter and the blank segments, in the manner described above, so that the mold tooth contours reflect very closely, but inversely, the contours of the desired cast teeth of the worm wheel, being but slightly greater in dimension to allow for shrinkage of the metal to be cast thereagainst to the desired tooth outline of the worm wheel.

It is evident that the product of such a method is a worm wheel having sufficient precision as to its tooth contours to be used immediately with a worm, without requiring further machining. Indeed, although a lapping operation may be performed or a minute amount of metal may be removed, this is unnecessary for the worm wheel upon removal from the composite mold does not even show mold marks at the lines of separation of the mold segments.

The claims in the present patent application are directed to the novel worm gear while other patentable features herein described are claimed in my divisional application Serial No. 630,431, filed December 12, 1956.

With these and other objects in view, the invention resides in the novel features of construction and combinations and arrangements of parts as more fully hereinafter set forth:

Figures 1, 1A, 14:
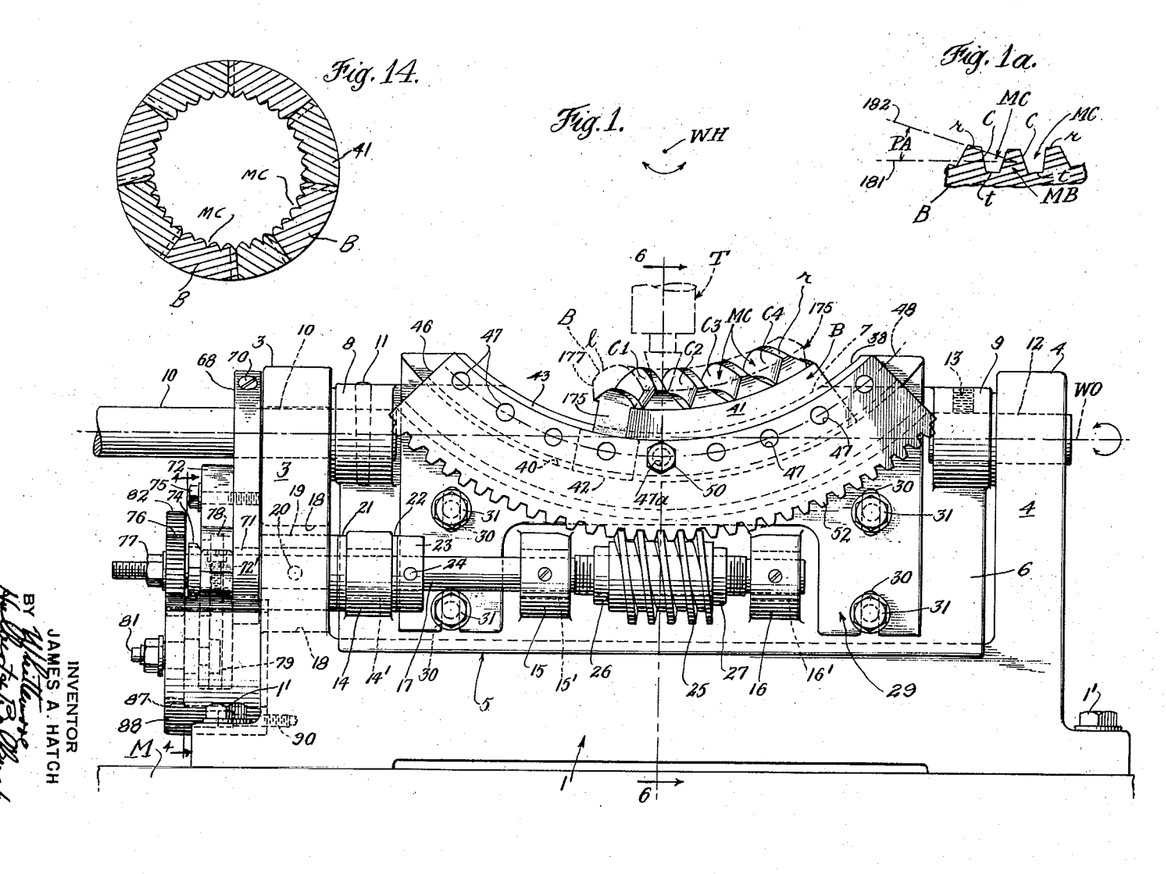
Fig. 1 is a front side elevational view of one embodiment of a machine constructed in accordance with the invention, and embodying one of several available types of driving arrangement.
Fig. 1a is a fragmentary side view, somewhat schematic in character, of certain parts of a mold segment produced by the machine and method.
Fig. 14 is a view in section on a plane normal to the axis of the assembly shown, generally illustrating the manner in which segments having mold cavities are arranged and held in a suitable retainer (not shown) in the form of a ring-like composite mold.
Figure 2:
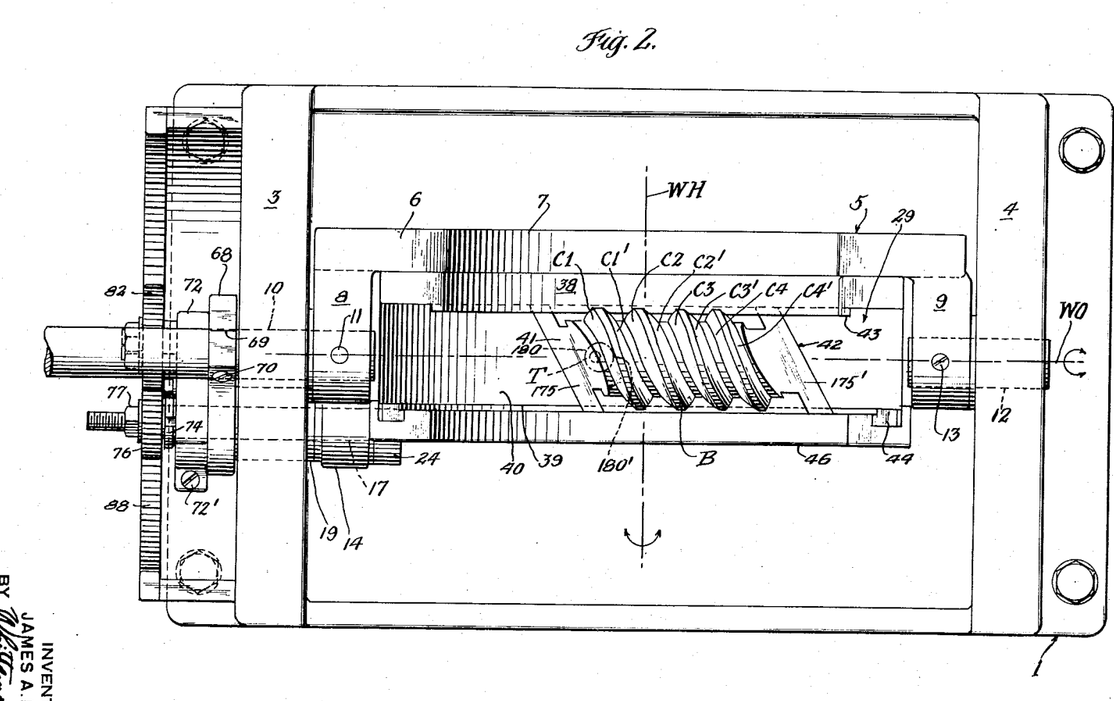
Fig. 2 is a plan view of the apparatus of Fig. 1, with certain parts omitted.

Referring to Figs. 1 and 2, the dot-dash line WO represents an axis which corresponds to the rotational axis of a standard worm with which a wheel to be cast is to be used. In Fig. 2, the dot and dash line WH (further identified by a dot in Fig. 1) represents the rotational axis of the worm wheel to be cast. These axes are substantially mutually perpendicular to and coplanar with one another and are in that fixed relationship for any operative position of the machine.

The rotational axis of the rotary end mill cutter or tool T, in the form of apparatus illustrated, is preferably in the plane of these axes, and is preferably arranged to be tiltable in this plane. For descriptive purposes, this plane will be referred to as the axial plane; it corresponds to what is commonly known as the axial plane of a worm wheel.

A finished mold segment B is shown mounted in the machine but this segment may also be considered to be unfinished blank, i. e., lacking the machined mold cavities MC. The dotted lines generally designated by the letter $l$ indicate the appearence of such blank. Fig. 1a is a fragmentary section of a finished segment B as taken in the axial plane and illustrates certain portions of the mold cavities MC. The letter C represents the sides or mold contours (also specially indicated by the letters C1, C2, etc., C1', C2', etc., in Figs. 1 and 2) which correspond to the sides or lead contours of the teeth of the wheel to be cast. The letter $t$ represents the root of the cavity or the throat of the tooth to be cast. The letters MB represent a mold matrix body (corresponding to the space between teeth to be cast) with the contours C on either side thereof. The letter $r$ represents the top of the mold body or the root between teeth to be cast. The various contours C1, C2, etc., C1', C2', etc., can be referred to as lead contours. A contour in the axial plane (as represented by the letters C in Fig. 1a) can be referred to as the pressure angle contour.

To form the various mold cavities in the mold matrix body MB in the preferred manner, the machine provides for the blank to engage and pass by the cutter by imparting to the blank two simultaneous motions—one motion being about the axis WO (to provide an inwardly convex cut across the axial plane of the mold section) and the other about the axis point WH (to produce the desired helix form). These rotations are generally indicated by the respective arrows adjacent the axes.

In accordance with the principles basic to my invention, a foundry mold is built-up from a plurality of arcuate segments which can be radially removed outwardly from the circumference of a gear wheel cast thereagainst. The mold segments are preferably derived by cutting a cast blank of appropriate cross sectional shape and thickness, the segments then being provided with mold cavities on their internal arcuate surfaces which are of such shape as to produce the desired contour of the teeth of the worm wheel.

These mold cavities must be of such accuracy and precision as can be produced only by a close tolerance mechanical cutting of the material thereof. Thus, it is a feature of my invention that a cutting tool be caused to generate the precise mold form required, which will in the case of a worm wheel be of convex outline from side to side across the arcuate inner surface of the mold blank segment being machined. The form takes into consideration not only the mathematically derived contours necessary for accurate engagement of the cast wheel, without further machining, with a mating worm, but must also vary the precise amount from the contour of the ultimate cast teeth to allow with accuracy for the shrinkage of the metal in cooling in the mold.

It is seen that only by adherence to these procedures is a gear wheel of sufficient accuracy produced to operate satisfactorily with a mating worm without further machining. The procedure cannot even be satisfactorily approximated as to results by procedures involving the casting of teeth on a mold segment, to be subsequently removed by machining, for such machining may necessarily require the removal of different amounts of metal at different places to remove scale and the like. It follows that a wheel or gear cast against such a mold will inherently result in the production of gear teeth of varying dimension.

In Fig. 1 the numeral 1 indicates a base, which may be mounted by any convenient means such as bolts 1'—1' on a sliding table M of a standard horizontal or vertical type milling machine having mechanism for moving the table in a vertical direction and to the left or right as viewed in Fig. 1. These standard machines are ordinarily employed in the service or maintenance shop of a foundry. The blank B is mounted on a cradle generally indicated by the numeral 5 and this cradle is arranged to be rotated about the axis WO.

As best seen in Figs. 1 and 2, the base 1 has two end uprights or supporting brackets 3 and 4, which carry the cradle 5. As best shown in Figs. 2 and 8, the cradle has a flat back portion 6, the top of which has an arcuate cut-out 7 (see also Fig. 7) and near the top at each side of the back portion are two forwardly projecting ring-like bosses or extensions 8 and 9. The extension 8 carries a shaft 10 which is rotatably mounted on the end upright 3 and is fixed to the extension 8 by a pin 11. Shaft 10 is driven by a suitable connection to the driving mechanism of the milling machine. The extension 9 is fixed to a stub shaft 12 as by set screw 13, the shaft being rotatably mounted in the end upright 4. The rotational axes of the shafts 10 and 12 coincide with the axis WO. The shaft 10 is rotated to cause rotation of the cradle 5, hence, of the mold blank, about the axis WO in a manner to be described.

There are three forwardly projecting journal extensions 14, 15 and 16 on the bottom part of the back portion 6. The extensions carry a shaft 17 (see Fig. 1) rotatably mounted therein as by bushings 14', 15' and 16'. The shaft extends through an arcuate slot 18 (see Figs. 3 and 4) in the upright 3, and when the cradle rotates about axis WO, the shaft 17 moves through this slot 18. As best seen in Fig. 5, the shaft carries a spacer 19 secured thereto as by the set screw 20 (Fig. 1). A thrust bearing 21 is disposed between the spacer 19 and extension 14 and a thrust bearing 22 is disposed between the extension 14 and a collar 23 held on the shaft as by set screw 24. Interjacent the two extensions 15 and 16 is a worm 25 which is keyed on the shaft 17 and held in axial position by the nuts 26 and 27, which are threaded on the shaft. Rotation of the shaft 17 causes the blank B to be moved about the axis WH, as will be described shortly.

Figure 6:
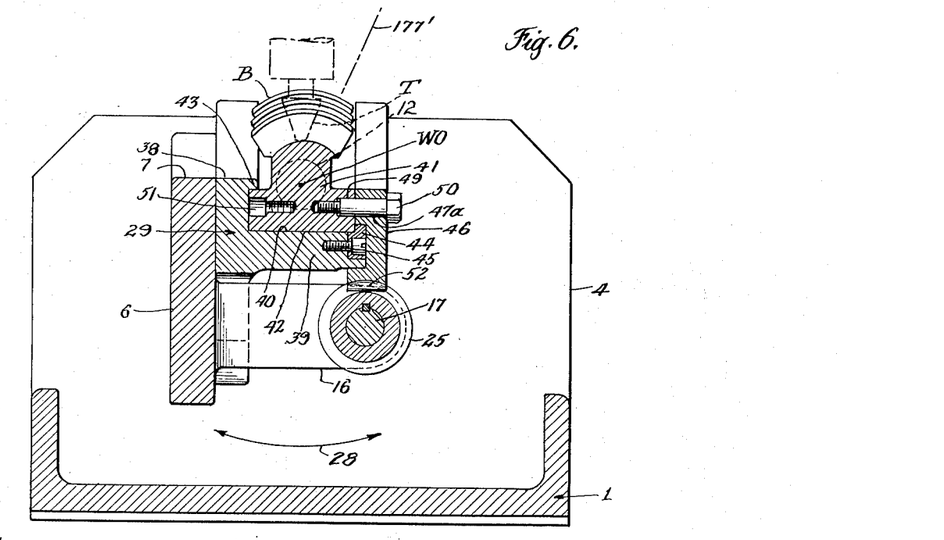
Fig. 6 is a cross section taken on the line 6—6 of Fig. 1.

As best seen in Figs. 1 and 6, the back portion 6 of the cradle carries an adapter generally indicated by the numeral 29. The adapter has a plurality of vertically extending slots 30—30 which receive the screws 31—31 threaded in the back portion 6 of the cradle. When the screws are loosened, the adapter may be vertically adjusted with respect to the cradle. The top of the adapter is provided with an arcuate cut-out 38 which, in the particular adjusted position thereof, is in line with the arcuate cut-out 7 on the cradle (see Fig. 6). Before proceeding, it is desired to point out that the cradle and adapter may be constructed as a single unit rather than as two parts, as shown.

Figure 7:
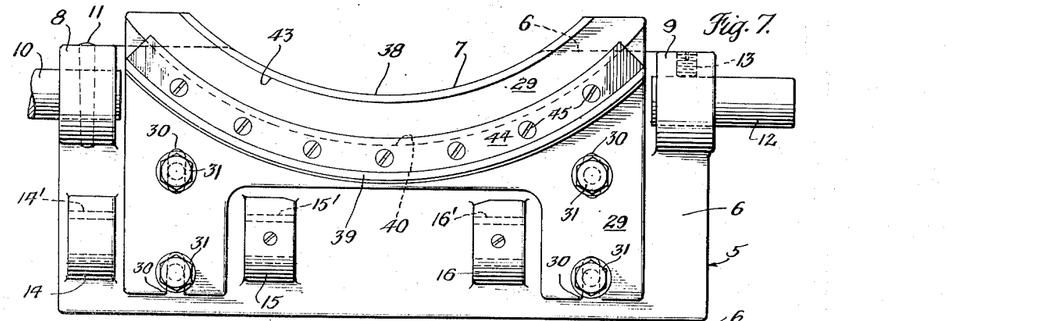
Fig. 7 is a front view of the structure of Fig. 6 looking towards the left in that figure with certain parts removed.
Figure 8:
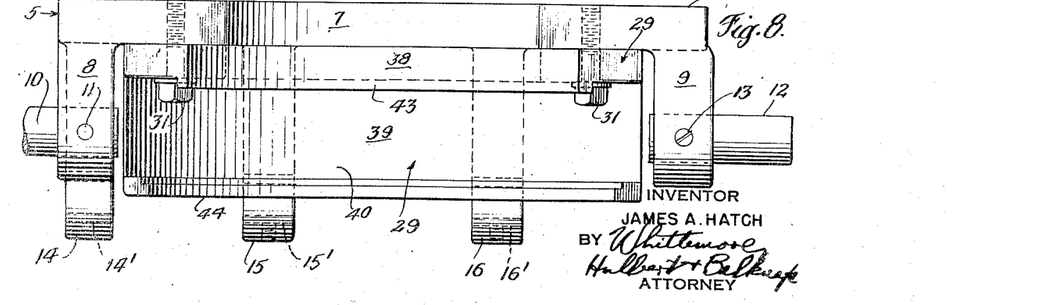
Fig. 8 is a plan view of the structure of Fig. 7.

As best seen in Figs. 6, 7 and 8, the adapter is provided with a forwardly extending arcuately-formed portion 39 having an arcuately-formed surface 40. The center or axis of this surface 40 is coaxial with the axis WH. As will be seen from an inspection of Fig. 6, in cross section the lower or radially outermost part 41 of the blank B is generally in the form of an inverted T and has an arcuate outer surface 42 which corresponds to and abuts the surface 40, as best seen in Fig. 1. It will be apparent that if the blank is moved longitudinally along the surface 40, i. e., as viewed from left to right or vice versa as viewed in Fig. 1, the motion of the blank will be about the axis WH. The radially innermost part of blank segment B constitutes a matrix portion in which the mold tooth cavities MC are to be machined.

As best seen in Figs. 6 and 7, the upper portion of the adapter has an arcuately-shaped lip 43 which fits over the bottom portion of the blank. The height of the blank B and the distance between the lip 43 and surface 40 is made whereby to provide a sliding fit for the blank. The outer end of the portion 39 of the adapter carries an arcuately-shaped guide 44, which is secured thereto as by screws 45. Fitting over the guide and portion 39 is an index sector or slider 46.

As seen in Figures 1 and 6, the slider 46 carries a plurality of apertures or holes 47—47 which lie along a common arc indicated by the dotted lines 48, the center of the arc being coaxial with the axis WH. The apertures or holes 47 are angularly spaced apart along the arc a distance corresponding to the axial angular distance between adjacent teeth of the wheel to be cast. As best seen in Fig. 6, the blank B has a hole 49 which lies on an arc whose center is coaxial with the axis WH. A pin 50 is inserted in the lowermost hole 47a and mates with threads in the blank hole 49 as indicated in Fig. 6. On the opposite side of the blank is located another hole 51, which is coaxial with the hole 49. When the pin 50 is inserted in the holes in the slider and blank, it is tightened sufficiently to firmly hold the blank B fixed with respect to the slider, yet provide a sliding fit between the slider and the guide 44 and adapter 29.

As seen in Fig. 1, the lower portion of the slider 46 is provided with a gear sector 52 which meshes with the worm 25. It will be apparent that when the worm 25 is rotated (by rotation of the shaft 17), the slider will be moved and hence, move the blank B along the surface 40 or about the axis WH.

The foregoing arrangement of pin and holes not only provides engaging means between the blank and the slider whereby the blank can be moved about the axis WH, but in addition, provides a means whereby the blank can be indexed about axis WH so that the various mold cavities can be formed at the proper places on the blank. The manner of indexing will be explained later.

Referring back to worm 25 in Fig. 1, it will be recalled that the worm is keyed on the shaft 17 and held in axial position by the threaded nuts 26 and 27. This arrangement permits the worm to be shifted axially on the shaft to cause movement of the slider and blank about the axis WH. For example, if the nut 27 is backed off and the nut 26 is screwed up, the worm will be shifted toward the right as viewed in Fig. 1. This adjustment is called "side feed" and is important because it provides a means for causing movement of the blank about the axis WH without any movement of the blank about the axis WO. As will be explained hereinafter, this side feeding is used in correctly setting up the blank with respect to the cutter for the cutting or forming operation. Typical drive mechanisms for effecting simultaneous motion of the blank B about the two axes will next be described.

As mentioned heretofore, rotation of shaft 10 causes the blank to be moved about the axis WO and rotation of shaft 17 causes the blank to be moved about the axis WH. There are two types of drives for effecting the rotation of said shafts shown herein. In one type, the shaft 10 is directly rotated and this rotation, acting through certain motion transfer mechanisms, causes rotation of shaft 17. In the other type, the shaft 17 is directly rotated and this rotation, acting through certain motion transfer mechanism, causes rotation of shaft 10. The motion transfer mechanism will next be described.

Figure 4:
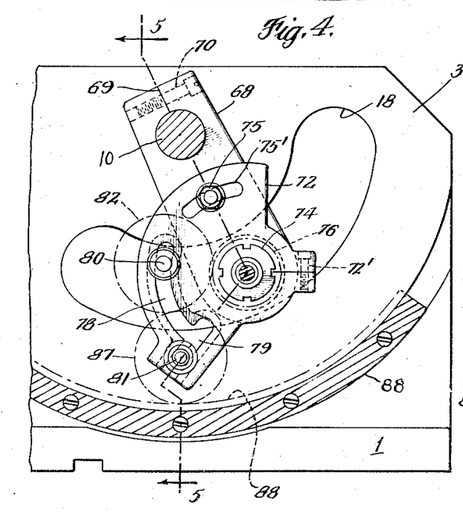
Fig. 4 is a fragmentary view in vertical cross section along line 4—4 of Figs. 1 and 5.
Figure 5:
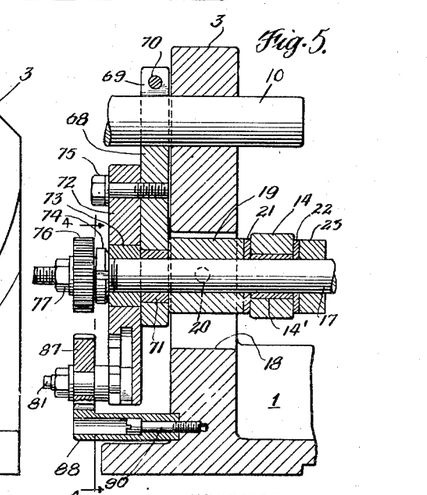
Fig. 5 is a fragmentary cross section taken on the line 5—5 of Fig. 4.

As best seen in Figs. 1, 4 and 5, a strap 68, which is slotted as at 69, is disposed over the shaft 10. By tightening up on the screw 70, the strap is fixedly held on the shaft 10. A bushing 71 is mounted on the bottom of the strap, which provides for the shaft 17 to be rotatably movable in the strap. As will be apparent, when the shaft 10 is rotated, the strap 68 will cause the shaft 17 to move through the arcuate slot 18, or alternatively, if the shaft 17 is moved through the slot 18, the shaft 10 will be rotated.

Figure 3:
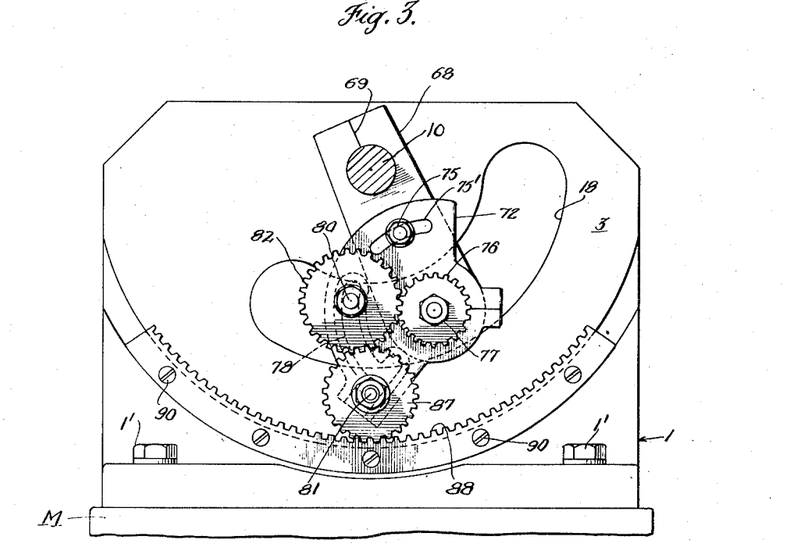
Fig. 3 is an end elevational view from the left of Fig. 1.

As best seen in Figs. 3, 4 and 5, a change gear bracket 72 is mounted on the shaft 17 by a bushing 73. The bracket is slotted and may be tightened up on the bushing as by the screw 72'. The mounting provides for the shaft 17 to be rotatable with respect to the bracket. The bracket is held fixed on the strap 68 by means of the lock-nut 74 threaded on the shaft 17 and further, by the screw 75 which is threaded into the strap. An arcuate slot 75' in bracket 72 provides for the angular adjustment of the bracket with respect to the axis of the shaft. A gear 76 is keyed on the end of the shaft 17, being held thereon by the nut and lock washer assembly 77.

The bracket 72 has further T slots 78 and 79 carrying idler studs 80 and 81, which can be adjusted in the slots and locked in position. These T slots and studs are of standard construction and need not be described in detail. The idler studs 80 and 81 respectively carry meshing gears 82 and 87, the former of which is in mesh with gear 76. An arcuate gear sector 88 is secured to the end upright 3 as by the screws 90 and is arranged to mate with the gear 87.

From the foregoing, it will be apparent that if the shaft 17 is directly rotated, gear 87 will be caused to run along the sector 88; hence, the strap 68 will be moved and this will cause rotation of shaft 10. Note also that the shaft 17 will move through the arcuate slot 18. On the other hand, if the shaft 10 is directly rotated, the strap 68 will cause the shaft 17 to move through the slot 18; and as a result the mold blank B in the cradle 6 carrying shaft 17 will be correspondingly rotated about the axis WO. Since the gear 87 is meshed with the sector 88, the gear 76 will also be rotated and cause rotation of shaft 17 about its own axis.

The above-described gearing, together with worm 25 and sector 29, is arranged so that the resultant compound motion of the blank follows, so to speak, the helix angle of the wheel to be cast. In other words, as the blank is rotated about the worm axis WO, it is simultaneously rotated about the wheel axis WH, the two rotations developing the desired helix. A different helix angle may be obtained by changing the gear ratios.

Figure 9:
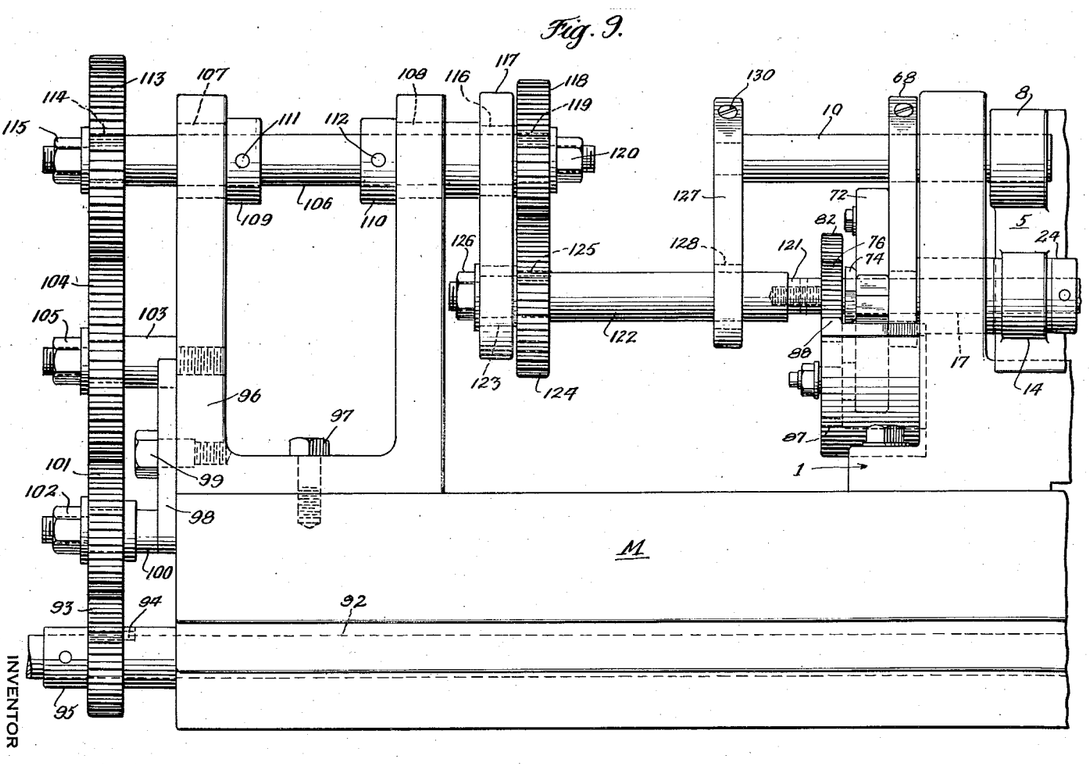
Fig. 9 is a fragmentary side elevational view illustrating an alternative drive arrangement for the machine.
Figure 10:
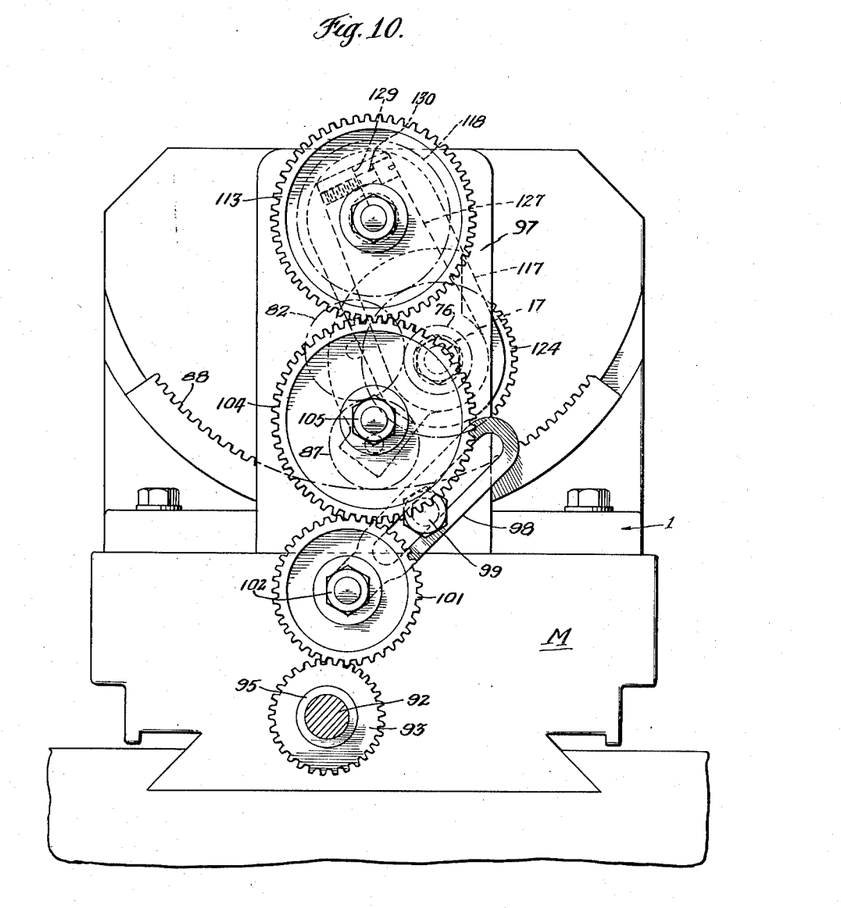
Fig. 10 is an end elevational view from the left of Fig. 9.

An arrangement wherein the shaft 17 is driven directly from the milling machine is shown in Figs. 9 and 10.

The base 1 is mounted on the slidable table M, which carries a shaft 92 interconnected to the driving mechanism of the milling machine. A gear 93 is mounted on a shoulder on the shaft and is keyed thereto as by key 94. A collar 95 holds the gear on the shaft. As indicated in Fig. 9, the shaft may extend outwardly and a handwheel (not shown) may be coupled thereto for manual operation in those instances where the driving mechanism for the milling machine has means for disengaging the shaft 92 from the drive.

Also mounted on the table M is a U-shaped bracket 96 which is secured thereto as by bolts 97. An adjusting arm 98 is secured to the bracket 96 as by the bolt or stud 99 and carries a stub shaft 100 on which is rotatably mounted a gear 101 held on the shaft as by the nut and washer assembly 102. This gear 101 meshes with the gear 93. Another fixed shaft 103 is threaded in the U-shaped bracket 96 and rotatably mounts the gear 104, which is held on the shaft by the nut and washer assembly 105. Near the top of the bracket is disposed a shaft 106 which is mounted in the bracket as by bushings 107, 108. Collars 109 and 110 are fixed to the shaft as by set screws 111 and 112 and operate to hold the shaft against axial movement. A gear 113 is mounted on a shoulder in the shaft 106 and is keyed thereto as by the key 114, the gear being firmly held on the shaft by the nut and washer assembly 115. This gear 113 meshes with the gear 104, which in turn meshes with gear 101 on arm 98. The opposite end of the shaft 106 carries a bushing 116 on which is mounted a strap 117, in which shaft 106 rotates. A gear 118 is mounted on a shoulder on the shaft 106 and is keyed thereto by the key 119. A nut and lock washer assembly 120 holds the gear and strap on the shaft.

As indicated in Fig. 9, a coupling device 121 end-couples the shaft 17 to another shaft 122 journalled in the lower part of strap 117 by means of a bushing 123. A gear 124 is mounted on a shoulder on the shaft 122 and is keyed thereto by key 125. A nut and washer assembly 126 holds the strap 117 and gear 124 firmly on the shaft 122, with the gears 118 and 124 in mesh with one another. The shaft 122 is also sustained in a further strap 127 by means of the bushing 128, the shaft being thus rotatable in strap 127 as well as strap 117. Preferably the top of the strap 127 is slotted as indicated at 129 (Fig. 10) and is held fixed on the shaft 10 by taking up a screw 130. The arrangement of the machine to the right of the coupling 121 (Fig. 9) is the same as has been previously described and need not be mentioned further.

When power is applied to the shaft 92, the gears 93, 101, 104 and 113 are rotated, which causes rotation of the shaft 106, gear 118, gear 124 and shaft 122. The rotation of shaft 122 causes the shaft 17 and the worm 25 to rotate, which causes the blank to move about the axis WH. Rotation of the shaft 17 in turn causes rotation of the shaft 10, by means of the motion transfer mechanism previously mentioned. Strap 127, being fixed on shaft 10, also aids in imparting rotation to shaft 10. However, the prime purpose of this strap and strap 117 is to maintain center distance between respective connected shafts.

Figure 13:
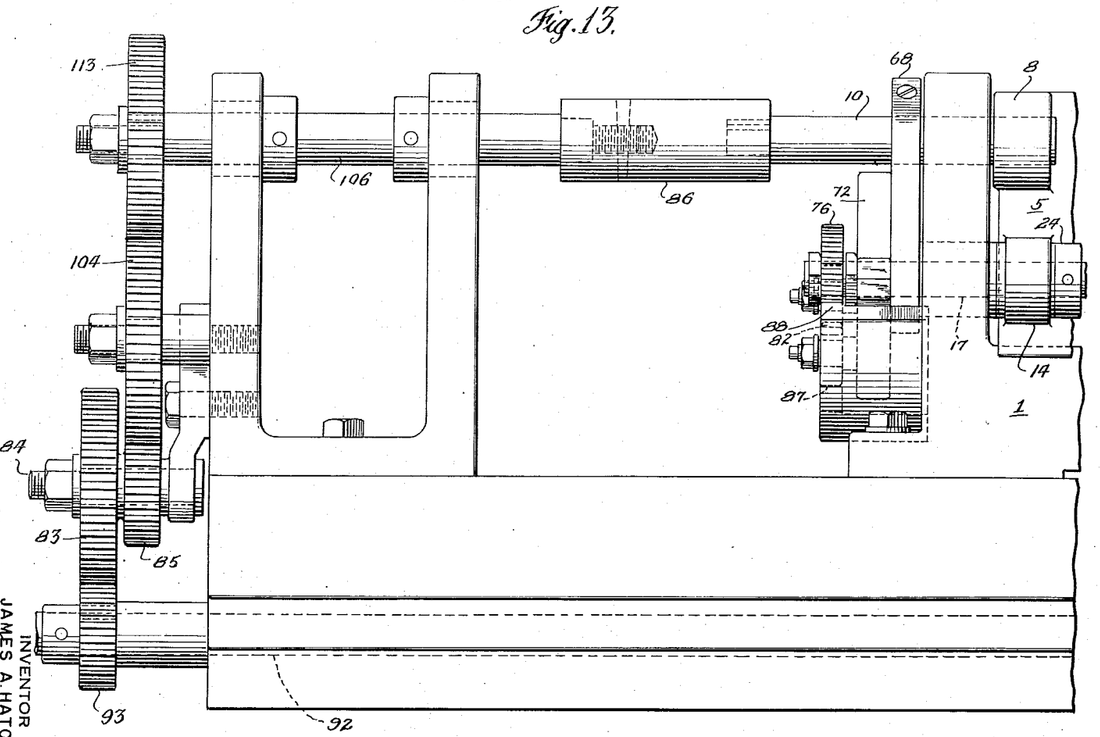
Fig. 13 is a fragmentary end elevational view illustrating a further alternative drive arrangement for the machine.
Figure 15:
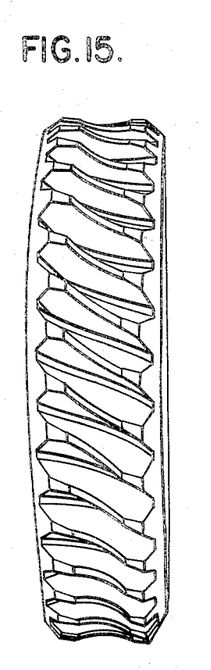
Fig. 15 illustrates a worm gear made in a accordance with the invention.

Figure 13 illustrates a modified arrangement wherein the shaft 10 is directly driven. Numbers corresponding to those used in connection with Figs. 9 and 10 are also used in Fig. 13, where the parts are the same or substantial equivalents. The gear 93 mounted on shaft 92 drives gear 83 rotatably mounted on a stud 84. The gear 83 is a double gear including a further gear 85 which drives gear 104. The gear 104 drives gear 113 and this, in turn, drives shaft 106, which is directly connected to shaft 10 by coupling 86. The machine to the right-hand side of the coupling (except for the size of gear 76 as noted below) is the same as has been described. Also, the effect of directly rotating shaft 10 has been described and need not be further mentioned.

The type of drive arrangement selected for use depends generally on the helix angle of the gear to be cast. The helix angle may require that the gear ratios be of a nature so that gear 76 on the shaft 17 is small or large. Where the gear 76 is large enough so that it is easily rotated by the gears 82 and 87, the arrangement of Fig. 13 is used. If the gear is small, the arrangement of Figs. 9 and 10 is used.

The drive arrangement of Figs. 9 and 10 provides an alternative means for side feeding. Note that if the gear 82 is removed from the change gear bracket 72 and the drive mechanism operated, the shaft 17 will be rotated; hence, the blank will be moved about the axis WH. The shaft 10 will, of course, remain fixed and there will be no motion of the blank about axis WO.

The following example will illustrate the gear ratios used in cutting a mold segment for one particular type of worm wheel. Worm and worm wheel data: 9¼/1 ratio (4 threads on worm and 37 teeth on wheel), 8.625" C. D., 14.002" P. D. of wheel, 1.2315" C. P. of wheel, 4.926" lead; slider (46) and worm (25) data: 117/1 ratio (1 thread on worm and 117 teeth on slider for 360°), 5.0" D. P., 23.4" P. D. of slider, 0.6283" lead; sector (88) data: 16 D. P., 256 teeth in 360°; gear (76) data: 20 teeth; gears (82) and (87) data: proper number of teeth to set up drive between sector 88 and gear 76. From an inspection of Fig. 6, it will be seen that the angular length of the tooth contours of mold segment B about the axis WO is substantially 90°. With the above-mentioned ratios, the blank will be moved 1.2315" about the axis WH (as measured on the pitch radius) for a 90° rotation about the axis WO.

A typical, so-called tin-rich bronze employed in casting the worm gear of the invention is designated S. A. E. #65, and has 89% copper and 11% tin content. This is a bearing alloy possessing ideal metallurgical properties for a worm gear.

Figure 11:
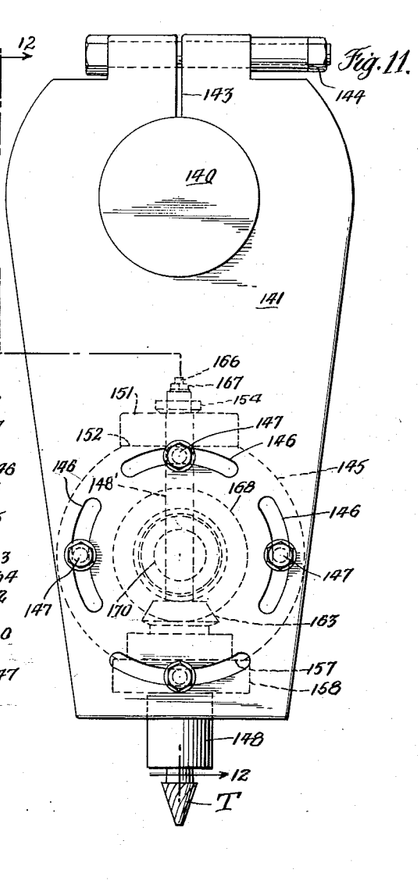
Fig. 11 is a front side elevational view illustrating a mounting for a rotary cutter or tool of the apparatus.
Figure 12:
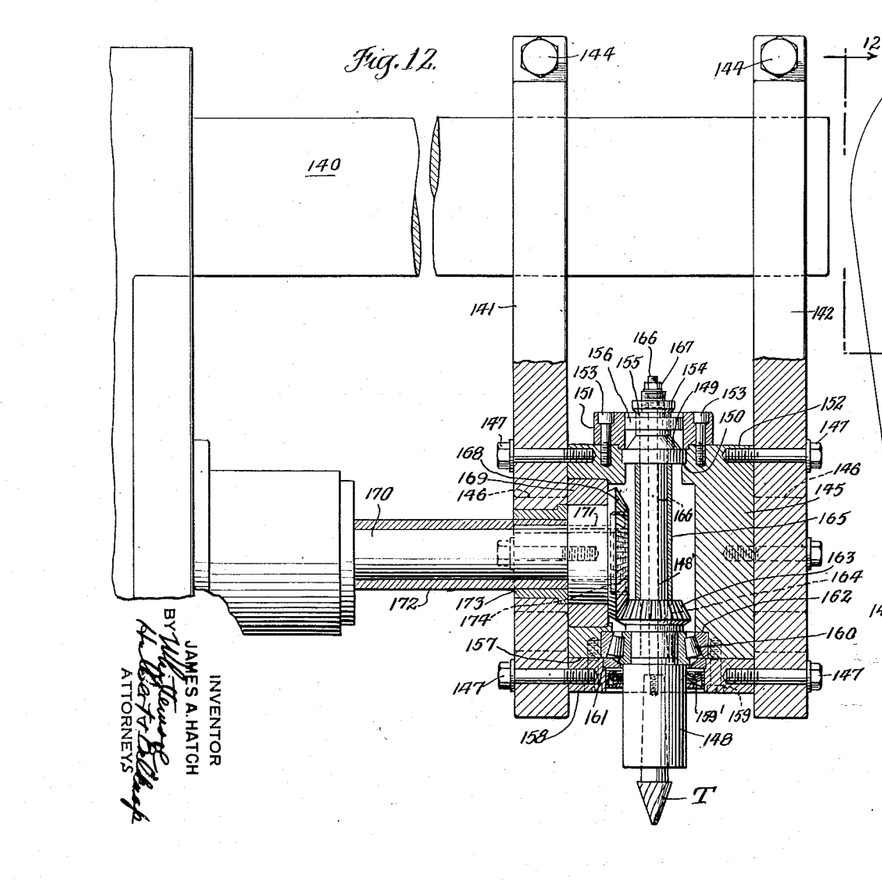
Fig. 12 is a fragmentary sectional view taken along the line 12—12 of Fig. 11.

The manner in which the cutter or tool T is mounted will be described in connection with Figs. 11 and 12. The cutter may be mounted in any convenient manner; however, it is preferred that the mounting arrangement provide for the rotational axis of the cutter to lie in the axial plane of the worm wheel and of the mold segment B. Also, it is preferable that the cutter be angularly adjustable in said plane. While Figs. 11 and 12 show a typical mounting arrangement for the cutter for use with a horizontal-type milling machine, it will be understood that a vertical-type machine can be used.

The horizontal supporting bar 140 of the machine has two depending bracket straps 141 and 142 secured thereto. As indicated in Fig. 11, the straps are provided with slots 143, and by tightening up on the nut and bolt assemblies 144, the straps may be held fixed on the bar. A generally cylindrical housing 145 is disposed between straps 141, 152, to which is secured the cutter T. Each strap is provided with a plurality of arcuate slots 146 through which extend screws 147 threaded in the housing 145 as indicated in Fig. 12. As will be apparent, if the screws 147—147 are loosened, the housing, hence the cutter T, can be angularly adjusted.

In order to mount the cutter in the housing 145 (Fig. 12) the housing has a vertical aperture and the cutter spindle 148 extends therethrough. Near the top, combination axial and radial thrust bearings 149 are mounted on a ledge 150 in the housing 145 and operate to rotatably support the spindle. A bearing retainer 151 engages a flat portion 152 of the housing 145, being secured thereto as by screws 153. A nut 154 is screwed on the spindle 148 and is pulled up against a spacer 155 which abuts bearings 149. An oil seal 156 is disposed interjacent the spaced and the bearing retainer. On a flat portion 157 on the bottom of the housing 145 is mounted a bearing retainer 158, which is secured thereto by screws 159. Combination axial-radial thrust bearings 160 support the spindle 148 and are mounted on a ledge 161 on the bearing retainer 158, bearing against a ledge 162 on the housing 145. An oil seal 159' is disposed around the spindle 148 shaft adjacent the bearing retainer 158. The spindle shaft 148' is rotated by a level gear 163 secured to the shaft as by key 164. A sleeve 165 is mounted over the shaft interjacent the bevel gear 163 and the bearings 149.

The cutter is held fast on the spindle by means of the draw bar 166 which extends through an aperture in the spindle shaft 148' and is pulled up tight by means of a nut 167 threaded on the upper end of the draw bar.

The bevel gear 163 meshes with a driving bevel gear 168 disposed within a bushing 169 held in the housing 145 by the bracket strap 141; and the bevel gear 168 is keyed to a drive shaft 170 by the key 171. The same key also connects the spacer sleeve 172 to the shaft, the spacer extending out to the milling machine so as to provide a bearing for the gear and being rotatable within the bushing 173. A nut 174 is threaded on the end of shaft 170 to hold the bevel gear 168 in axial position. The drive shaft 170 is connected to mechanism in the milling machine which provides for rotation thereof.

The manner in which the machine is operated to cut blanks into mold segments will next be described.

First, a plurality of segmental blanks B which will go to make up the ultimate mold are produced by sawing segments of the dotted-line outline *l* (Fig. 1) from a continuous circular blank casting (not shown) which has the same radial cross sectional proportions as the sawed mold section B. Fig. 14 shows a plurality of these segments arranged together in the form of a ring-like composite mold, the mold cavities being designated MC.

The radial dimensions and sectional dimensions of the ring casting are such that following the sawing of a mold segment B therefrom and the machining of teeth therein by the structure above described, a worm wheel chill cast against a mold composed of such machined segments will have the desired dimensions in regard to its diameter, width and tooth proportions. A number of mold segments B sufficient to make up a composite 360° annular mold are then machined from these rings, the ends of each blank being cut radially and on a predetermined face-to-face or top to bottom bias such as is indicated by the numeral 175 in Figs. 1, 2 and 14. The index holes 49 and 51 are accurately located with respect to the ends. From an inspection of Figs. 1 and 2, it will be apparent that the top portion of the blank B (as indicated by the dotted lines *l*) is generally concave (as viewed from axis WH) and that the various mold cavities or mold contours which are cut therein are generally convex with respect to the concave portion as viewed from the same position.

In machining the top portion of the blank and in cutting the various mold contours, casting shrinkage factors are taken into account. This is done on the basis of radial shrinkage, i. e., assuming that the casting shrinks toward the center. The composite mold is oversize, so to speak, so that as the molten metal contracts on cooling, the wheel will be within desired tolerances. With bronze i. e., the tin-rich bronze described above, the usual shrinkage allowance is $\frac{1}{64}$" per inch. Thus, for the casting of, say, a 12" diameter wheel, the segments are made as if the wheel were $12\frac{3}{16}$" diameter. The outer surface of the top portion of the blank is machined so that as the casting cools, the portion *r* will correctly form the root of the teeth. Also, as noted later, the cutter is maintained in cutting portion *t* at a predetermined distance from the axis WO so that as the casting cools, the throats on the wheel are correct. The shrinkage allowance for *r* and *t* automatically compensates for the shrinkage of the contours, although allowance for this may be provided in some instances.

There are several alternative ways of operating the machine to form the mold cavities. For example, the mold contours or lead contours C1, C2, etc., can be sequentially formed on a first blank and then the other blanks making up the composite mold are sequentially inserted into the machine and the corresponding mold contours formed thereon. Then the original blank can be again set up in the machine and the contours C1', C2', etc., formed. A similar operation is sequentially performed on the remainder of the blanks. Alternatively, the segments can be completed one at a time. For example, the contours C1, C2, etc., can be formed on the first blank and then the contours C1', C2', etc., formed on the same blank. Or the contours on either side of a mold body can be formed (such as C1 or C2) and then the mold contour on the other side of the mold body (C2 or C1) can be formed and then the mold contours on the next mold body formed, etc. It will be apparent that other ways to form the cavities are available with the machine but in any event, it is preferred that the procedure requiring the least number of adjustments to make all of the segments for the composite mold be adopted. The preferred methods will be explained shortly but it is desired first to comment on the arrangement of the cutter.

Ordinarily, the cutter is angularly adjusted by means of housing 145 in the axial plane so that the rotational axis is offset from the mutual perpendicular of the two axes WH and WO. The general effects of offsetting will be later described.

One effect is to enable the machine to form the desired contour or lead contours on the blank to correspond to the desired lead contours of the teeth of a wheel to be used with a cylindrical worm or to correspond to teeth on a wheel for use with a double enveloping worm. Exact tooth form for such wheels may vary depending upon such factors as load, speed and other known factors. In a typical tooth for use with a double enveloping worm, the tooth may be thickest at the center and thinnest at the outer edges, the decrease in thickness being symmetrical about the center. In a typical tooth for use with a cylindrical worm, the tooth may be thinnest at the center and thickest at the outer edges, the increasing thickness being symmetrical about the center.

A wheel having teeth for use with a cylindrical worm will be termed hereinafter a "cylindrical wheel" and a wheel having teeth for use with a double enveloping worm will be termed a "double enveloping wheel."

Ordinarily, the pressure angle contour of a tooth on a double enveloping wheel is straight, i. e., in cross section the shape of a tooth is generally in the form of a truncated triangle. Thus, for forming contours in a blank for casting this type of tooth, the cutter is generally conical in shape so that the cutting edge is straight. The pressure angle contour of a tooth on a cylindrical wheel is generally curved or involute in form and the cutter used is semispherical, so to speak, i. e., so that the cutting edge is inversely curved or involute.

The rotational axis of the cutter is ordinarily positioned either to the left or right side (as viewed in Figs. 1 and 2) of the mutual perpendicular of axes WO and WH. In either case, for cutting the contours for a double enveloping wheel, the side or edge of the cutter farthest from the mutual perpendicular is used, while in cutting the contours for a cylindrical wheel, the side or edge of the cutter nearest the mutual perpendicular is used.

The following example will illustrate the foregoing. For a tooth for a double enveloping wheel the rotational axis of the cutter may be oriented to the left of the mutual perpendicular (as viewed in Fig. 2) and the edge indicated at 180 used. For a tooth for a cylindrical wheel the edge 180' would be used.

The other effect of offsetting the cutter is in the formation of the pressure angle or pressure contour of the tooth to be cast. This will be apparent from an inspection of Fig. 1a where (assuming the mold cavity MC is the tooth of a wheel) the pressure angle is indicated as PA, i. e., the angle between the tangent 181 to the pitch line and the normal 182 to the contour. By tilting the cutter, the pressure angle or contour may be changed. Further, it will be apparent that the pressure angle may be determined or effected by the particular shape of the cutter.

The lead and pressure angle contours of the teeth of the wheel to be cast can be obtained by the selection of the amount of offset and the shape of the cutter.

With the above in mind, we return now to an explanation of the preferred methods of the invention.

Having constructed several blanks for the composite mold and arranged the gear ratios (both in accordance with the specifications of the wheel to be cast), the machine must be set up so that the contours cut will give the desired tooth shape in the casting. This involves the shape of the cutter and the offset of its rotational axis from the mutual perpendicular.

The particular shape and offset of the cutter can be calculated from the known pressure angle and lead contour of the teeth of the desired wheel and then the cutter offset by locating the axis relative to some known point on the machine. However, for most foundry purposes, the wheel to be cast will be a duplicate of a wheel already made, say, for example, by known hobbing methods. Thus, the machine of the invention can be set up by using a master segment made from such a wheel.

The master segment is usually made from an arcuate wooden blank having the same cross sectional shape as the lower portion 41 of the segments. This is placed at the proper distance from the center of the wheel to be duplicated and plaster poured interjacent the blank and the wheel teeth. Thus, the blank is provided with a plaster section having the impression of the teeth on the wheel. A locating hole (corresponding to index hole 49) is machined in the master. While this hole must be located so that when the master is placed on the cradle it will line up with any of holes 47—47 on the slider, it is not too important where the hole is located along the arcuate length of the master. Preferably the hole should be between two adjacent impressions.

The milling machine table is then operated to move the cradle downwardly away from the cutter and the master mounted on the cradle and the pin 50 inserted in the hole 47a and in the locating hole in the master. The machine is then operated to arrange the cradle symmetrically about the axial plane, i. e., as shown in Fig. 6.

The cutter is then arranged so that its rotational axis is vertical and the table moved horizontally so that the mutual perpendicular of the axes WH and WO and the rotational axis of the cutter are coaxial. This locating can be done by conventional shop methods. The table is then moved upwardly and the cutter axis is offset so that the cutting edge of the cutter lies along the pressure angle contour of a mold body on the master and so that the bottom of the cutter abuts the throat (corresponding to throats t—t in Fig. 1a). The particular mold body and contour thereof selected depends upon the type of tooth to be cast and whether the cutter is to be offset to the right or left-hand side of the mutual perpendicular. It is pointed out that the foregoing adjustment may require some side feeding of the master. Incidentally, it should be observed that side feeding is always done with the cradle arranged symmetrically about the axial plane; this, of course, sets up the master, blank or segment (whichever is mounted in the cradle) symmetrical with respect to the axial plane.

After the above is completed, the machine is made to operate, preferably by hand, so that the two simultaneous motions about the axes WO and WH are imparted to the master. The position of the cutter along the lead contour is observed during this motion. If the lead contour of the master pulls away or goes into the cutting edge, the machine is operated to place the master back in the axial plane and then a little more offset is given to the cutter and/or the machine is side fed to bring the cutting edge up to the pressure angle contour. Further, the table may have to be raised to bring the lower end of the cutter abutting the throat. The machine is then put through the simultaneous motions to see that the lead contour follows the cutting edge.

After the above-described adjustments are correctly made, the machine is set up to cut the mold cavities on the blanks. The table-lifting mechanism on the milling machine can then be marked so that when the table is lowered, it can subsequently be raised to the correct throat position. The shrinkage factor for the throats can be set into this position.

The milling machine table is then lowered and the master segment removed and a blank inserted in the cradle by inserting the pin 50 in the hole 47a and the hole 49 (or 51). The milling machine table is then moved upwardly to the throat position and the machine operated to impart the simultaneous motions to the blank to put the same in the axial plane. Ordinarily, the end of the blank will be somewhat spaced (along the axis WO) from the cutter. The cutter is then turned on and the blank side fed into the cutter a sufficient depth so that enough metal is available for forming all of the desired contour.

The milling machine table is then lowered and the machine is operated to impart the simultaneous motions and the blank is put in position for the contour forming operation. Preferably this is with the blank rotated to a clockwise position (Fig. 6) where the edge 177 (Fig. 1) is about in the position of the dotted line 177′ (Fig. 6). The table is then raised to the throat position and then the machine operated so that the simultaneous motions are imparted to the blank and the first contour, say, the contour corresponding to C1, is formed.

The table of the milling machine is then lowered away from the cutter and the blank indexed. This is done by taking out pin 50, moving the blank so that its hole 49 (or 51) is lined up with the hole (47) in the slider adjacent hole 47a and then re-inserting the pin. The machine is then operated for simultaneous movement of the blank to contour cutting position. The machine is operated to cut the next contour, say, C2. The above procedure is then followed for the remaining contours, say, C3 and C4.

The next adjacent blank making up the composite mold is inserted in the cradle and contours corresponding to C1, C2, etc., are cut. The remaining blanks are then sequentially operated on to cut the corresponding contours. After all of the blanks have been so worked, the first blank is then reinserted in the cradle but turned 180°, i. e., end-for-end. With the table at the correct throat position, a rough cut can be made close to the ultimate position of contour C1′ and then the blank side fed so that the contour C1′ is located or spaced the correct amount from the contour C1. After this adjustment has been made, the machine is operated so that the contours corresponding to C1′, C2′, etc., are formed. The remaining blanks are taken in order and the corresponding contours formed therein.

The above-described method for forming the mold cavities is preferred because the chance of error is minimized. The bias on the edges and the index holes are very accurately located with respect to one another and the same accuracy is maintained as between blanks. Once the first contour C1 on the first blank has been cut, the accurate machining of the blanks and the indexing arrangement automatically insures that all of the corresponding contours around the mold will have the correct spacing. The same holds true after the contour C1′ is correctly spaced from C1.

Instead of sequentially forming the contours corresponding to C1, C2, etc., on all of the blanks making up the mold, the same contours can be formed on a single blank and then that blank set up end-for-end in the machine and the contours corresponding to C1′, C2′, etc., be formed. Similar operations can be made on the remaining blanks.

Also, it will be apparent that when the contours corresponding to C1, C2, etc., have been formed on a blank, the contours corresponding to C1′, C2′, etc., can be formed by leaving the blank in its initial position on the cradle and arranging the cutter to occupy a mirror image position on the opposite side of the mutual perpendicular.

It is pointed out that in operating the machine for making any of the contours as above-described, the cut is taken in the same direction. In other words, the direction of movement of the blank with respect to the cutter should always be the same when a contour is being formed. In this manner, the effect of backlash in the various gear trains is eliminated. Further, it is mentioned that the cradle may, if it is desired, be provided with appropriate counterweights so as to provide a balancing of the mass about the axis WO.

With the above-described methods, worm wheels can be cast with teeth so precise in dimension that a wheel merely has to be run in or possibly lapped to be suitable for its intended purpose. Indeed, the wheels may be used directly as cast, particularly where lead is added to the bronze to get desired lubricating properties. In some instances, where the particular application of the wheel requires, the wheel may be cast with the teeth somewhat oversized in order to leave metal for a subsequent machining or hobbing operation. However, it is contemplated that the machining of the mold blank segments shall afford a desired slight oversize as to the tooth contours of the completed mold segment, so that shrinkage after molding against these contours will result in a worm wheel proportioned exactly as desired after removal from the composite, multi-segment mold.

One of the important advantages associated with the above-described casting of worm wheels is that the finished wheel has highly desirable metallurgical properties, which enhances operating characteristics. The segments forming the composite mold of the invention serve as chills, i. e., act to rapidly freeze and cool the metal in and around the wheel teeth. This provides the desired metallurgical structure in the teeth and in the area extending radially inwardly somewhat beyond the roots.

A photomicrograph of a section of the worm wheel through a tooth thereof reveals a uniform distribution as to its grain structure throughout, from the root, sides and crest of each tooth formation inwardly into the body of the gear, as a result of the chill casting to accurate ultimate gear proportions. This is possible only when the mold against which the chill casting is performed, is itself accurately machined in regard to the tooth proportions. By contrast, the removal by machining of a substantial skin layer of metal from a cast gear blank in conventional gear-developing operations exposes grain structure at the working surfaces of the gear teeth which is non-uniform in the extreme. Improved tensile strength and wearing qualities are derived by the improved chill casting procedure of the invention.

Another important advantage of the invention is in the savings realized by the reduction in the total metal required for a wheel. Where wheel teeth are made by machining, metal must be provided for the cutting tool to remove and so shape the tooth form. In casting, of course, this metal is not required and something in the order of 50% of the metal around the tooth area is saved by the present invention. Since most wheels are formed of bronze, in particular tin-rich bronze alloys, both of which are relatively expensive, the importance of the above-mentioned saving is readily appreciated.

What I claim as my invention is:

1. A worm gear having teeth conjugate to a mating worm, said teeth having the metallurgical characteristics of cast metal which has been cast immediately adjacent to a metal mold, wherein the tooth surfaces are equivalent in form and finish to a generated machined worm gear tooth surface, and the grain structure of said tooth surface is uniform throughout, such uniformity of grain structure extending inwardly from the root, sides and crest of each tooth into the body of the gear.

2. A worm gear according to claim 1 in which the metal is a non-ferrous alloy.

3. A worm gear according to claim 1 in which the metal is a metal alloy having a melting point above 1550° F.

4. A worm gear according to claim 1 in which the metal is bronze having a melting point above 1550° F.

5. A worm gear according to claim 1 in which the metal is an alloy of approximately 89% copper and 11% tin.

6. A worm gear having a body portion and a surrounding tooth portion integral therewith, both of cast bronze having a melting point not substantially less than 1900° F. and having tensile strength exceeding 50,000 p. s. i., the surfaces of the tooth portions having the metallurgical characteristics of that portion of chill cast bronze which is immediately adjacent to a metal mold in which it is cast, said tooth surfaces also having the form, profile, pitch, pressure angle, root diameter, outside diameter, and chordal thickness at the pitch line of the teeth of a generated machined worm gear that is conjugate to a mating worm, and said tooth surfaces having uniform bronze grain structure throughout extending inwardly from the root, sides, and crest of each tooth into said body portion.

References Cited in the file of this patent
UNITED STATES PATENTS

| | | |
|---|---|---|
| 131,486 | Wheeldon | Sept. 17, 1872 |
| 1,723,773 | Eicher | Aug. 6, 1929 |
| 1,822,800 | Cone | Sept. 8, 1931 |
| 2,374,904 | Walcher | May 1, 1945 |
| 2,392,968 | Bell | Jan. 15, 1946 |
| 2,538,368 | Kost | Jan. 16, 1951 |
| 2,623,438 | Ockerman | Dec. 20, 1952 |
| 2,633,776 | Schenk | Apr. 7, 1953 |
| 2,662,450 | Angell et al. | Dec. 15, 1953 |
| 2,679,669 | Kempe | June 1, 1954 |
| 2,703,511 | Griner | Mar. 8, 1955 |
| 2,716,791 | Schellens | Sept. 6, 1955 |

OTHER REFERENCES

"Die Castings," Herb 1st ed., pp. 235–238.

"Metals and Alloys," October 1943, pp. 784–788.

"Die Casting for Engineers," 1942, pp. 32 and 33. New Jersey Zinc Co.